United States Patent [19]
Morrow

[11] Patent Number: 5,993,184
[45] Date of Patent: Nov. 30, 1999

[54] MAGNETIC FAIRING BARS FOR BONDING TOOLS

[75] Inventor: Christopher J. Morrow, Wichita, Kans.

[73] Assignee: The Boeing Company, Seattle, Wash.

[21] Appl. No.: 09/019,324

[22] Filed: Feb. 5, 1998

[51] Int. Cl.[6] .............................. B29C 70/44; B29C 33/32
[52] U.S. Cl. .............................. 425/3; 156/382; 425/389; 425/405.1; 425/DIG. 33
[58] Field of Search ........................... 425/3, 389, 405.1, 425/DIG. 33; 264/510, 571; 156/285, 382

[56] References Cited

U.S. PATENT DOCUMENTS

| | | | |
|---|---|---|---|
| 2,920,360 | 1/1960 | Strobel | 425/DIG. 33 |
| 3,146,148 | 8/1964 | Mitchella et al. | 264/571 |
| 3,195,207 | 7/1965 | Fougea | 425/DIG. 33 |
| 3,321,807 | 5/1967 | O'Brien | 425/DIG. 33 |
| 3,530,540 | 9/1970 | Mueller | 425/3 |
| 3,910,748 | 10/1975 | Kopernik | 425/DIG. 33 |
| 4,836,765 | 6/1989 | Kornitzky et al. | 156/285 |
| 4,869,770 | 9/1989 | Christensen et al. | 156/382 |
| 4,961,894 | 10/1990 | Yabe et al. | 425/3 |
| 5,328,540 | 7/1994 | Clayton et al. | 156/285 |
| 5,593,633 | 1/1997 | Dull et al. | 264/510 |
| 5,612,062 | 3/1997 | Takahashi | 425/3 |

FOREIGN PATENT DOCUMENTS

| | | | |
|---|---|---|---|
| 1503651 | 12/1967 | France | 425/DIG. 33 |
| 53-12964 | 2/1978 | Japan | 264/571 |
| 6-99456 | 4/1994 | Japan | 264/510 |
| 2073648 | 10/1981 | United Kingdom | 264/571 |

*Primary Examiner*—Robert Davis
*Attorney, Agent, or Firm*—Christensen O'Connor Johnson & Kindness PLLC

[57] ABSTRACT

A bonding tool assembly (10) for supporting a composite part structure (11) during fabrication and curing processes, includes a bonding tool (12) and a plurality of fairing bars (14). The bonding tool (12) contains a support surface (16) upon which a composite part structure (11) is placed. The plurality of fairing bars (14) are placed completely around the periphery of the composite part structure (11) providing lateral support. The fairing bars (14) each contain a mating surface (18) which is placed directly upon the support surface (16) of the bonding tool (12). Each mating surface (18) contains a plurality of extended indexing protrusions (20) which form a distinct pattern and are secured by threaded fasteners (21). The support surface (16) contains a plurality of indexing recesses (22) that are configured to form the same pattern as the indexing protrusions (20) such that the fairing bars (14) and the bonding tool (12) are matable. Each fairing bar (14) also contains a plurality of magnets (24) that are located in pockets (26) slightly above the mating surface (18) of the fairing bars (14). The magnets (24) are secured in the pockets (26) by a heat-resistant adhesive (28). The fairing bars (14) magnetically adhere to the support surface (16) of the bonding tool (12) which is either adapted of a magnetically conductive material or contain magnetically conductive inserts (30).

31 Claims, 3 Drawing Sheets

MAGNETIC FAIRING BARS FOR BONDING TOOLS

FIELD OF THE INVENTION

The present invention relates to the use of fairing bars with bonding tools as used to support edges of composite structures during fabrication and curing processes, and more particularly to the incorporation of magnets into the bonding tool assembly to replace hard fasteners.

BACKGROUND OF THE INVENTION

The use of high strength fiber-reinforced composite material in the manufacture of aircraft and other lightweight structures has increased steadily since the introduction of such materials. Composite materials have a high strength to weight ratio and stiffness. These properties make composite materials attractive for use in the design of lightweight structures. One of the major drawbacks to using composite materials however, is the relatively high cost of production using these type of materials.

When a bonded composite assembly is fabricated it is "layed-up" in a bonding tool. Most composite assemblies consist of a skin (usually fiberglass, graphite, or aluminum) that sandwiches a core material that is also usually fiberglass, graphite, aluminum, or titanium. The core is generally hexagonal in shape although other core shapes can be implemented as well. There are several different variations of the composite assembly process in use, but all are eventually autoclave or oven cured in a bonding tool.

During the curing process a composite assembly is sealed inside a vacuum bag and then placed in an autoclave or oven, for curing at elevated pressures. To prevent damage to the composite assembly during the curing process, fairing bar are required to be used. The function of the fairing bars is two-fold: (1) to keep the vacuum bag from breaking due to bridging over voids or gaps along the edges, and (2) to prevent the composite core from being crushed in a "domino effect" due to the lateral forces from the pressurization. Composite materials are typically quite susceptible to collapse from lateral forces and thus need to be supported laterally in order to withstand the forces created by the elevated pressures of the curing process.

Fairing bars are typically positioned around the periphery of each composite assembly. Typically between 12 and 20 fairing bars are used per tool, although this number can vary widely depending upon the size and complexity of the composite assembly. The composite fabrication process requires that the fairing bars be removable. Thus, each fairing bar is configured to be bolted or otherwise hard fastened to the bonding tool, usually with a minimum of three bolts per fairing bar. Such bolts engage vacuum bushings inserted through the facesheet of the tool at each bolt location. Inserting such bushings typically requires that a computer controlled six axis mill be used to bore each hole, countersink the hole, and then backspotface the hole. After each hole is machined, an internally threaded vacuum bushing is inserted, sealed (usually with a silicone adhesive), and then checked for integrity.

The bonding tool is then released to production workers who bolt each fairing bar in place during the composite fabrication process. In order to hold each fairing bar in position bolts are used that are approximately 0.5 inches to 2.0 inches in length.

Prior to bolting the fairing bars in place, the bolts are coated using a releasing agent, such as Frekote®. This releasing agent is designed to prevent the composite resins, which flow freely in the composite assembly during curing, from permanently adhering the bolts to the fairing bars and the bonding tool and thus, the fairing bars to the bonding tool. Following each oven or autoclave cycle, these bolts are removed along with the fairing bars. At this stage bolts are often lost, requiring the acquisition of replacement bolts. In addition to the time required to obtain new bolts, further time is also required for each new bolt to be coated with a releasing agent.

For the manufacture of most parts, production workers must spend several hours locating bolts and securing the fairing bars to the bonding tool. This process is then subsequently repeated, since these fairing bars must be removed after every autoclave or oven cure cycle. In approximately 25% of any given run of composite parts, at least one of the bolts becomes bonded into the tool, thus locking the fairing bar to the bonding tool. This can require several further hours to remedy. Also, approximately 0.25% of all composite parts have to be scrapped due to loss of vacuum pressure during an autoclave cycle. This is directly attributable to vacuum bushings leaking, which occurs as a result of over torquing of the bushings and cracking of the bushings due to temperature and pressure cycling.

Previous attempts have been made to avoid the above mentioned problems and costly production time requirements. One such attempt to quicken the indexing and securing of fairing bars to a bonding tool, relied on "bullet nosed liners" to replace bolts. This technique basically mated short male pins with female bushing. This technique was unsuccessful however in that the pins had a tendency to fall out and/or break under heated, pressurized conditions. This pin/bushing method was also ineffective in holding a fairing bar to a vertical surface. Thus, a sound technique is still needed that can provide the benefits of securely bolting fairing bars to bonding tools without the inherent costly production time delays resulting therefrom.

SUMMARY OF THE INVENTION

The present invention discloses a bonding tool assembly for supporting composite structures during a curing process. The assembly includes a bonding tool with a support surface for supporting a composite structure during the fabrication and curing of the structure. This bonding tool also contains a plurality of indexing recesses that are located in a pattern on the support surface of the tool. The assembly further includes several fairing bars that extend along the periphery of the composite structure and have mating surfaces which interface with the bonding tool. Each fairing bar also contains a plurality of indexing protrusions that project from the mating surface of the fairing bars. These indexing protrusions are arranged in a pattern that corresponds to the locations of the indexing recesses in the bonding tool, thus allowing the fairing bars to be easily positioned on the bonding tool. Further, each fairing bar also contains a plurality of magnets that are positioned in pockets a small distance, e.g., 0.040 inches above the mating surface of the fairing bars, in order to secure the fairing bars to the bonding tool. Correspondingly, the bonding tool includes a magnetically conductive portion that is aligned with the plurality of magnets when the mating surfaces of the fairing bars are properly mounted on the support surface of the bonding tool.

In a preferred embodiment of the present invention, each fairing bar in the bonding tool assembly contains at least two heat-resistant Samarium Cobalt magnets of grade 22 or higher, adjacent to the fairing bar mating surface. These magnets are secured in pockets milled into the side of the fairing bars, by an adhesive material that is capable of withstanding the temperatures and pressures experienced in the curing processes. The bonding tool itself is composed of an iron based alloy (usually Invar®) so as to provide a magnetically conductive support surface to which the fairing bars can locate. This process can also be used on aluminum, graphite, or nickel tools by incorporating magnetically conductive inserts.

The mating surface of each fairing bar additionally contains a plurality of indexing discs or pins which are secured into the fairing bars through the use of either press fitting or threaded fasteners, and are configured to form a pattern. The support surface of the bonding tool in turn contains a plurality of indexing recesses that are configured to form a pattern which corresponds to the pattern of the indexing discs in each respective fairing bar, thus allowing the fairing bars and the bonding tool to be selectively mated into precise alignment around the periphery of a composite assembly during the fabrication and curing process.

The present invention eliminates the need for all fairing bar bushings and bolts, and as such greatly reduces tool fabrication costs, the time required for tool rework, the time required for tool set-up, and the time required for tool disassembly, as well as the costs associated with defective composite parts due to faulty vacuum bushings and other inherent problems in the traditional procedure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
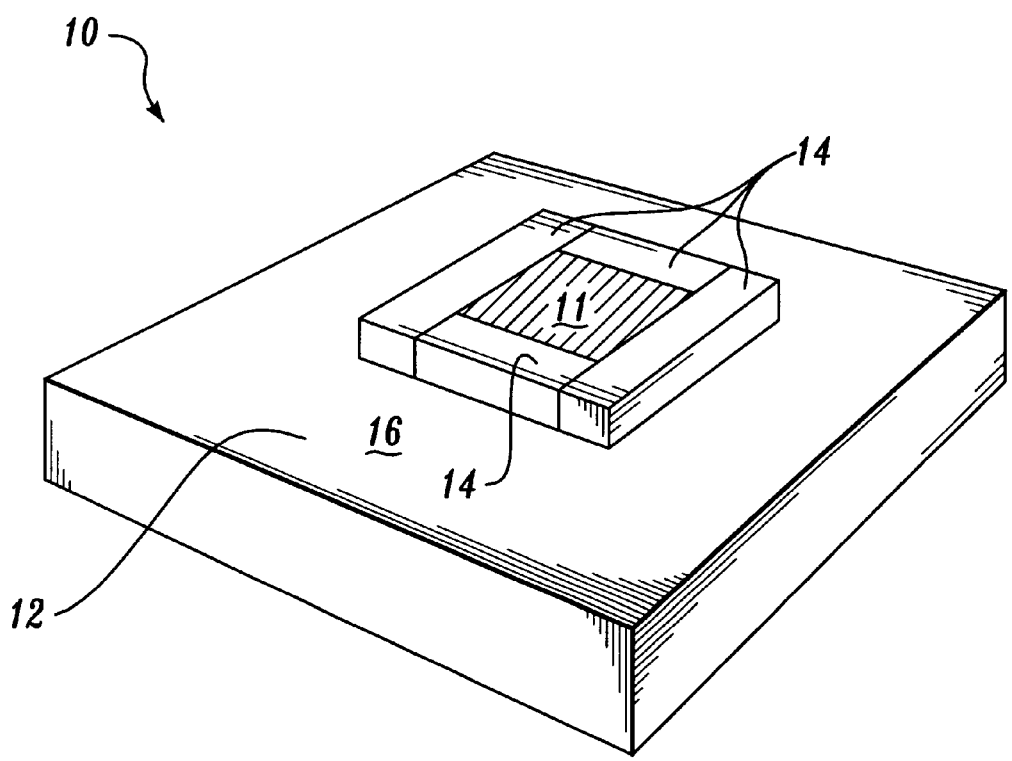
FIG. 1 illustrates a side elevation view of a preferred embodiment of the present invention with an iron-composition bonding tool.

FIG. 1 illustrates a preferred embodiment of a bonding tool assembly 10 constructed in accordance with the present invention for supporting a composite part structure 11 during the fabrication and curing processes. The assembly 10 includes a bonding tool 12 and a plurality of fairing bars 14. The bonding tool 12 provides a support surface 16 upon which a composite part structure 11 is placed during the fabrication and curing processes of the composite structure 11. A plurality of fairing bars 14 are positioned completely around the periphery of the composite part structure 11 to provide lateral support. The fairing bars 14 are fabricated with a mating surface 18 which is placed directly upon the support surface 16 of the bonding tool 12.

A plurality of indexing protrusions 20 extend from the mating surface 18. These indexing protrusions 20 form a distinct pattern and are secured to the fairing bars 14 by threaded fasteners 21. Correspondingly, the bonding tool 12 employs a plurality of indexing recesses 22 that extend into the support surface 16. The indexing recesses 22 are positioned in the same pattern as the indexing protrusions 20 in the fairing bars 14, thus allowing the fairing bars 14 and the bonding tool 12 to be matable by way of the indexing protrusions 20 and the indexing recesses 22.

Each fairing bar 14 also employs a plurality of magnets 24 that are located in pockets 26 formed in the mating surface 18. The magnets 24 are secured in the pockets 26 by a heat-resistant adhesive 28. The fairing bars 14 are thereby magnetically secured to the support surface 16 of the bonding tool 12, which is either composed of a magnetically conductive material or contain magnetically conductive inserts 30.

The bonding tool 12 forms the base of the bonding tool assembly 10 and is the main supporting structure for a composite part 11 during the fabrication and curing processes. The bonding tool 12 is preferably composed of Invar®, which is an iron-based alloy, and as such possesses magnetically conductive properties. The bonding tool 12 provides a support surface 16 upon which a composite part 11 is directly mounted and to which to the fairing bars 14 are magnetically secured. If the support surface 16 is composed of aluminum, graphite, or some other non-magnetically conductive material then a magnetically conductive insert can be set into the support surface 16.

Indexing recesses 22 are located on the support surface 16 of the bonding tool 12. Since these recesses 22 are used only for indexing purposes and not for securing purposes, the recesses need not be deep indentations but typically require a minimum depth of only about 0.075 inches. The diameter or width of the indexing recesses 22 need only be large enough to allow insertion of the indexing protrusions 20. Generally, two or three indexing recesses 22 per fairing bar 14 are sufficient for indexing purposes. The indexing recesses 22 require only basic boring; no countersinking spot facing, back spot facing or threading is required.

The bonding tool assembly 10 also includes a plurality of fairing bars 14. The fairing bars 14 are placed around the periphery of a composite part 11 being fabricated on the support surface 16 of the bonding tool 12. Generally, between twelve and twenty fairing bars 14 are required per composite part 11. However, since ideally the fairing bars 14 completely surround the periphery of the composite part 11 during the fabrication and curing processes, the number of fairing bars 14 can vary greatly depending on the size and complexity of the composite part 11 being produced. The support provided by the fairing bars 14 is crucial, particularly during the curing process where strong lateral forces are produced due to the elevated pressures generated within a vacuum bag in which the composite part is housed during the curing process. Without the lateral support from the fairing bars 14, the sides and the vertically oriented, honeycomb-shaped internal structure of the composite part 11 would be crushed in a "domino-like effect."

The indexing protrusions 20 are located in the mating surface 18 of the fairing bars 14. These indexing protrusions 20 usually are in the shape of discs or pins and are secured in place press fitting or by utilizing threaded fasteners 21.

Since the indexing protrusions 20 are used only for indexing purposes and not for securing purposes, they need not be of great length but rather need only be a minimum of about 0.070 inches in length. Generally, only two or three indexing protrusions 20 are required per fairing bar 14. The indexing protrusions 20 are positioned in the same pattern as the indexing recesses 22 of the bonding tool 12. Thus, the indexing protrusions 20 are matable with the indexing recesses 22 such that the mating surfaces 18 of the fairing bars 14 can be placed into substantial contact with the support surface 16 of the bonding tool 12.

Figure 2:
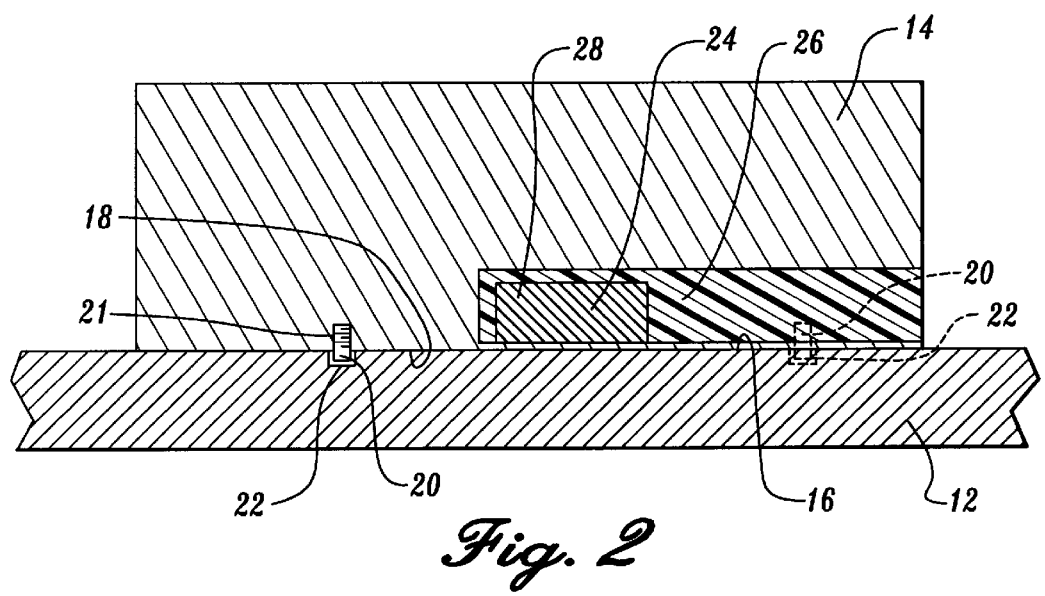
FIG. 2 illustrates a side elevation view of the present invention where the bonding tool is composed of a magnetically conductive material to interface with the magnets in the fairing bars.
Figure 3:
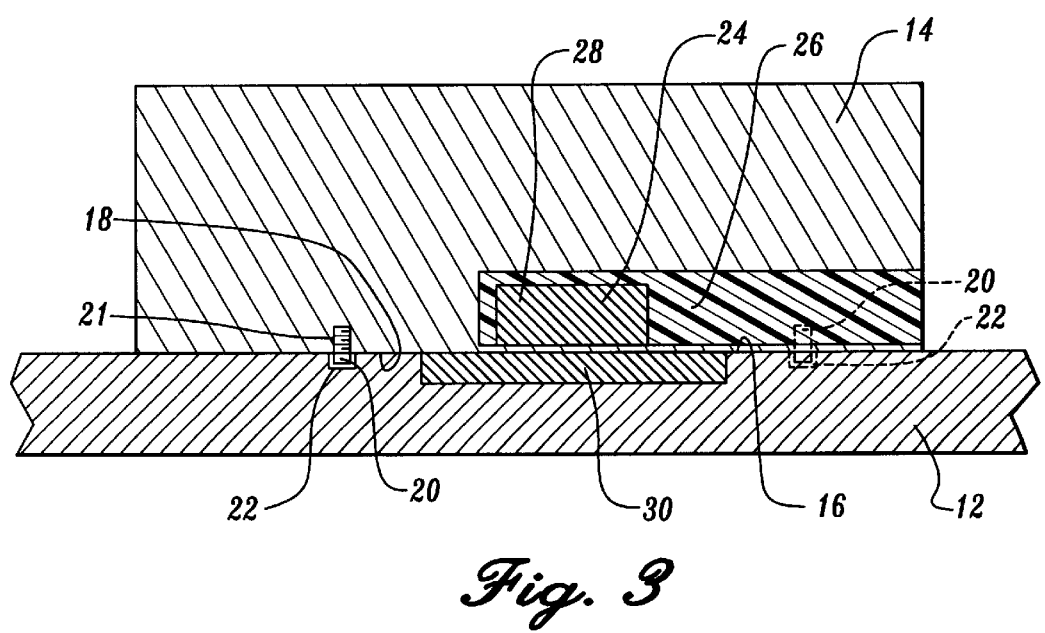
FIG. 3 illustrates a side elevation view of the present invention where the bonding tool is composed of an aluminum, graphite, or nickel material and includes a magnetically conductive insert in the bonding tool to interface with the fairing bars.
Figure 4:
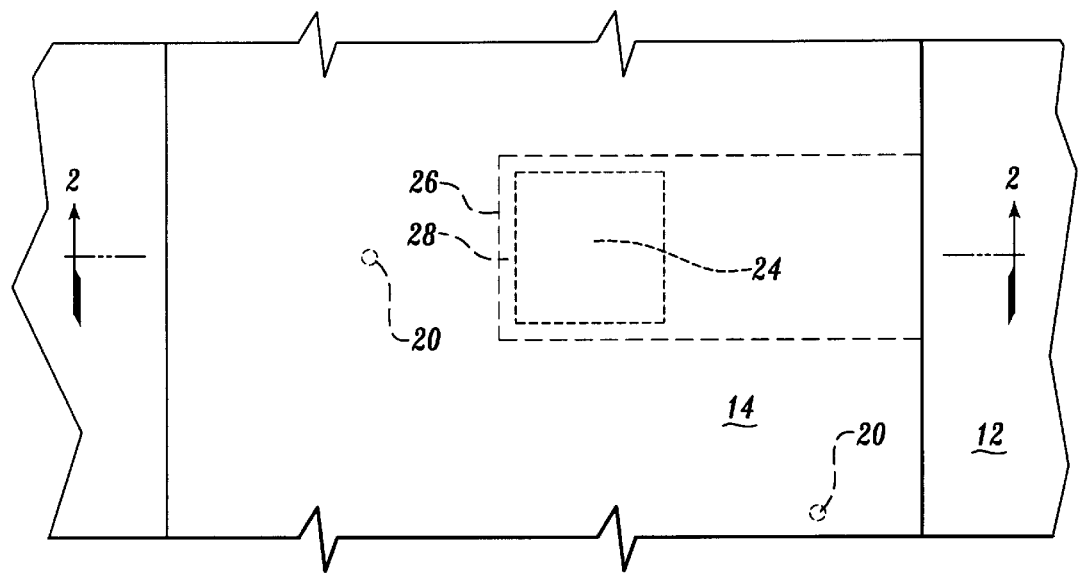
FIG. 4 illustrates a top view of the present invention showing a magnet secured into a pocket in the fairing bar, shown in phantom lines.
Figure 5:
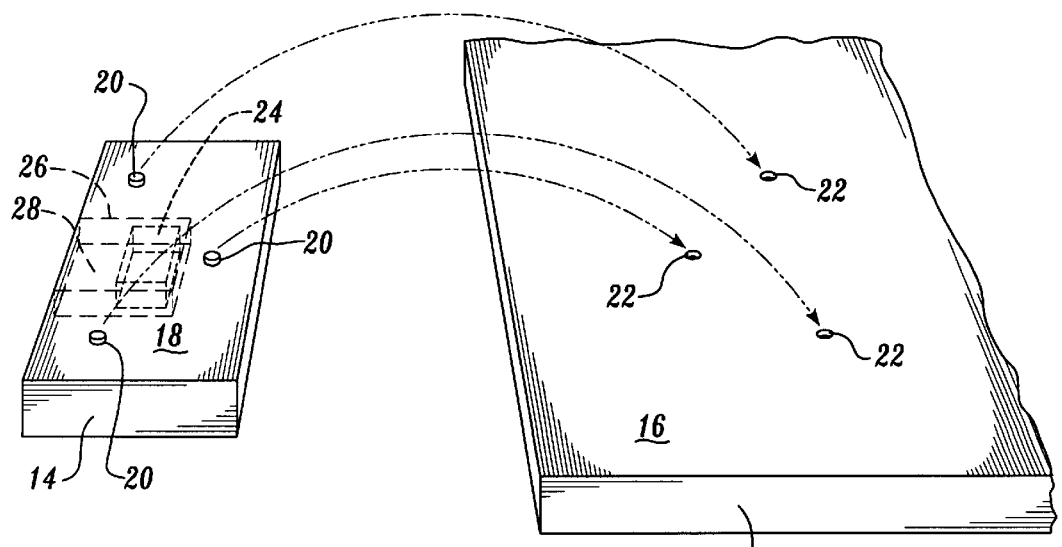
FIG. 5 illustrates a top view of the present invention showing the corresponding patterns of the indexing discs in the fairing bar and the indexing recesses in the bonding tool.

In a preferred embodiment of the present invention, the magnets 24 are inserted into pockets 26 formed in the sides of the fairing bars 14 that entirely encapsulate the magnets 24, as can be seen in FIG. 2. A thin (approximately 0.040 inch) film of material separates the magnets 24 from the mating surface 18. These pockets 26 are generally formed by milling but can also be produced by way of any suitable cavity forming process. In an alternate embodiment of the present invention (not shown), the magnets 24 are secured into the pockets 26 such that the outwardly protruding side of the magnets 24 are substantially flush with the mating surface 18. The magnets 24 are held in the pockets 26 with a suitable adhesive 28 that is capable of maintaining its adhesive properties even under the elevated temperatures and pressures that are experienced during the curing processes. A silicon rubber-type material is often utilized for this purpose.

In a preferred embodiment of the present invention, the magnets 24 are produced from a magnetic stock of Samarium Cobalt of grade 22 or higher, and have dimensions approximately of one inch square by one-half inch in thickness. Samarium Cobalt has the unique ability to maintain its magnetic properties under extreme elevated temperatures. Other magnets could be used that possess a greater magnetic strength and/or are of larger dimensions, provided that these magnets could also maintain their magnetic properties under the elevated temperatures and pressures experienced during the curing process. Typically, temperatures are of around 550° Fahrenheit and pressures range from 45 to 90 pounds per square inch. Further, other magnets could be used that have a minimum magnetic strength equivalent to or greater than a magnet with a maximum energy product of 22 mega gauss oersted and dimensions of approximately one inch square by one-half inch in thickness, as long as such magnets can maintain their magnetic properties under the conditions experienced during the curing processes.

The optimum number and placement of magnets 24 will vary according to several factors, including the weight of the fairing bar 14 and the angle of the support surface 16 of the bonding tool 12 upon which the fairing bar 14 rests. To conform to the above-stated parameters, fairing bars 14 require a minimum of two magnets 24. The magnets 24 should be placed approximately 2.5 inches from each end of the fairing bar 14 along approximately its centerline. Further, one magnet should be used for every eight pounds of fairing bar 14, in situations where the angle from horizontal of the support surface 16 of the bonding tool 12 is less than 60 degrees. One magnet 24 should be used for every six pounds of fairing bar 14 however, in situations where the angle from horizontal of the support surface 16 of the bonding tool 12 is greater than 60 degrees. If a fairing bar 14 requires more than two magnets 24 due to the above stated requirements, the additional magnets 24 should be evenly spaced along the length of the fairing bar 14. Additionally, when utilizing fairing bars 14 which vary greatly in height from one end to the other, one magnet 24 should be placed at the center of gravity of the fairing bar 14 and the other magnets 24 at the ends of the fairing bar 14. On convex shaped bonding tools 12, the fairing bars 14 on the lower edges of the tools which run parallel to the floor, required a minimum of three magnets 24 and should weigh no more than 9 pounds. Finally, magnetic adherence should only be used to secure fairing bars 14 to a bonding tool 12 when the widths of the fairing bars 14 are equal to or greater than the heights of the fairing bars 14.

In an alternate embodiment, the indexing protrusions 20 could be located on the support surface 16 of the bonding tool 12 instead of on the mating surface 18 of the fairing bars 14, and the indexing recesses 22 in turn located upon the mating surface 18 of the fairing bars 14 instead of on the support surface 16 of the bonding tool 12, without departing from the scope of the present invention. In an additional alternate embodiment, either in conjunction with, or in alternative, to the above-described reversal of locations of the indexing protrusions 20 and indexing recesses 22, the magnets 24 could be secured in pockets formed in the support surface 16 of the bonding tool 12 instead of in the mating surface 18 of the fairing bars 14, without departing from the scope of the present invention. This alternate embodiment would require that the mating surfaces 18 of the fairing bars 14 be composed of a magnetically conductive material or contain a magnetically conductive insert 30.

An assembly constructed in accordance with the present invention that incorporates magnetic fairing bars eliminates the need to bore approximately 75% of the holes presently required in the facesheets of the tools. The magnetic fairing bar assembly also eliminates the need to bolt and unbolt fairing bars between curing cycles as well as removing the possibility of the bolts becoming adhered in the bonding tool as a result of the free flow of resins during the curing process. A further advantage is that the magnetic fairing bar assembly substantially reduces the proportion of composite parts that must be rejected (approximately 0.25% of all parts currently produced) due to faulty vacuum bushings.

The present invention has been described in relation to a preferred embodiment and alternate embodiments. One of ordinary skill after reading the foregoing specifications, may be able to effect various other changes, alterations, and substitutions or equivalents without departing from the concepts disclosed. It is therefore intended that the scope of the Letters Patent granted hereon be limited only by the definitions contained in the appended claims and equivalents thereof.

The embodiments of the invention in which an exclusive property or privilege is claimed are defined as follows:

1. A bonding tool assembly for supporting composite structures during curing processes, comprising:
  a bonding tool having a support surface for supporting a composite structure during fabrication and curing of the composite structure, the bonding tool having a plurality of indexing recesses located in a pattern in the support surface;
  at least one fairing bar extending along the periphery of the composite structure and having a mating face to mate with the bonding tool, the at least one fairing bar having a plurality of indexing protrusions projecting from the mating face of the at least one fairing bar and arranged in a pattern corresponding to the locations of the indexing recesses of the bonding tool, to only position and not substantially secure the at least one fairing bar on the bonding tool; and
  said at least one fairing bar further comprising a plurality of magnets positioned adjacent to the mating face of the at least one fairing bar to secure the at least one fairing bar to the bonding tool sufficiently to resist movement of the at least one fairing bar by vacuum forces of an autoclave.

2. An assembly according to claim 1, wherein the support surface of the bonding tool is adapted of a magnetically conductive material, whereby the at least one fairing bar magnetically adheres to the support surface upon their selective engagement.

3. An assembly according to claim 1, wherein the support surface of the bonding tool is composed of non-magnetically conductive material, and further comprises magnetically conductive insert, whereby the mating surface of the at least one fairing bar magnetically adheres to the support surface of the bonding tool via the magnetically conductive upon selective engagement.

4. An assembly according to claim 1, wherein the shortest distance across the mating face of the at least one fairing bar is defined as the width, and the distance across the at least one fairing bar orthogonal to the mating surface is defined as the height, and the width of the least one fairing bar is greater than or equal to height of the least one fairing bar.

5. An assembly according to claim 1, wherein said magnets are comprised of a heat resistant material whose magnetic properties can withstand curing processes.

6. An assembly according to claim 5, wherein said magnets have a minimum magnetic strength equivalent to or greater than a magnet with a maximum energy product of 22 MGOe (mega gauss oersted) and dimensions of one inch length by one inch width by one half inch thickness.

7. An assembly according to claim 6, wherein said magnets are comprised of Samarium Cobalt, of grade 22 or higher, and are of a size greater than or equal to one inch length by one inch width by one half inch thickness, or of equivalent dimensions.

8. An assembly according to claim 1, wherein the at least one fairing bar defines a plurality of pockets in which said magnets are secured by an adhesive material that can maintain its adhering properties under the temperature and thermal expansive conditions of curing processes.

9. An assembly according to claim 8, wherein said magnets are secured in said pockets by a silicone rubber material.

10. An assembly according to claim 1, wherein said plurality of indexing protrusions are attached to the least one fairing bar by threaded fasteners.

11. An assembly according to claim 1, wherein said plurality of indexing protrusions are attached to the least one fairing bar by press fitting.

12. An assembly according to claim 1, wherein said indexing recesses extend into said support surface of the bonding tool at least 0.075 inches.

13. An assembly according to claim 1, wherein said indexing protrusions extend out from the mating face of the at least one fairing bar, at least 0.070 inches.

14. An assembly according to claim 6, wherein one secured magnet is utilized per 8 pounds of fairing bar, for a fairing bar mating face with an angle of less than 60 degrees from horizontal.

15. An assembly according to claim 6, wherein one secured magnet is utilized per 6 pounds of fairing bar, for a fairing bar mating face with an angle of greater than 60 degrees from horizontal.

16. An assembly according to claim 6, wherein one secured magnet is utilized per 3 pounds of fairing bar, for a fairing bar mating face that is parallel to the floor along the bottom edge of a substantially convex shaped bonding tool.

17. A bonding tool assembly for supporting composite structures during curing processes, comprising:
  a bonding tool having a support surface for supporting a composite structure during fabrication and curing of the composite structure;
  at least one fairing bar extending along the periphery of the composite structure and having a mating face to mate with the bonding tool;
  a plurality of indexing protrusions operatively connected with one of the mating face of the at least one fairing bar and the support surface of the bonding tool, the locations of said indexing protrusions configured to form a pattern;
  a plurality of indexing recesses extending into the other of the mating face of the at least one fairing bar and the support surface of the bonding tool, and arranged in a pattern corresponding to the locations of the indexing protrusions, to only position and not substantially secure the at least one fairing bar on the bonding tool;
  a plurality of magnets operatively connected with one of the mating face of the at least one fairing bar and the support surface of the bonding tool; and
  the other of the at least one fairing bar and bonding tool having a magnetically conductive portion aligned with the plurality of magnets when the mating face of the at least one fairing bar is mounted on the support surface of the bonding tool, securing the at least one fairing bar to the bonding tool sufficiently to resist movement of the at least one fairing bar by vacuum forces of an autoclave.

18. An assembly according to claim 17, wherein the shortest distance across the mating face of the at least one fairing bar is defined as the width, and the distance across the at least one fairing bar orthogonal to the mating surface is defined as the height, and the width of the least one fairing bar is greater than or equal to height of the least one fairing bar.

19. An assembly according to claim 17, wherein said magnets are comprised of a heat resistant material whose magnetic properties can withstand curing processes.

20. An assembly according to claim 19, wherein said magnets have a minimum magnetic strength equivalent to or greater than a magnet with a maximum energy product of 22 MGOe (mega gauss oersted) and dimensions of one inch length by one inch width by one half inch thickness.

21. An assembly according to claim 20, wherein said magnets are comprised of Samarium Cobalt, of grade 22 or higher, and are of a size greater than or equal to one inch length by one inch width by one half inch thickness, or of equivalent dimensions.

22. An assembly according to claim 17, wherein said magnets are secured in said pockets by an adhesive material that can maintain its adhering properties under the temperature and thermal expansive conditions of curing processes.

23. An assembly according to claim 17, wherein said magnets are secured in said pockets by a silicone rubber material.

24. An assembly according to claim 17, wherein said plurality of indexing protrusions are operatively connected with one of the mating face of the at least one fairing bar and the support surface of the bonding tool by threaded fasteners.

25. An assembly according to claim 17, wherein said plurality of indexing protrusions are operatively connected with one of the mating face of the at least one fairing bar and the support surface of the bonding tool by press fitting.

26. An assembly according to claim 17, wherein said indexing recesses extend into either the mating face of the at least one fairing bar or the support surface of the bonding tool, at least 0.075 inches.

27. An assembly according to claim 17, wherein said indexing protrusions extend out from the other of the mating face of the at least one fairing bar and the support surface of the bonding tool, at least 0.070 inches.

28. An assembly according to claim 20, wherein one secured magnet is utilized per 8 pounds of fairing bar, for a fairing bar mating face with an angle of less than 60 degrees from horizontal.

29. An assembly according to claim 20, wherein one secured magnet is utilized per 6 pounds of fairing bar, for a fairing bar mating face with an angle of greater than 60 degrees from horizontal.

30. An assembly according to claim 20, wherein one secured magnet is utilized per 3 pounds of fairing bar, for a fairing bar mating face that is parallel to the floor along the bottom edge of a substantially convex shaped bonding tool.

31. A bonding tool assembly for supporting composite structures during curing processes, the assembly including a bonding tool having a support surface for supporting a composite structure during fabrication and curing of the composite structure, the support surface having magnetically conducting portions, the bonding tool having a plurality of indexing recesses located in a pattern in the support surface, the assembly comprising:

at least one fairing bar extending along the periphery of the composite structure and having a mating face to mate with the bonding tool, the at least one fairing bar having a plurality of indexing protrusions projecting from the mating face of the at least one fairing bar and arranged in a pattern corresponding to the locations of the indexing recesses of the bonding tool, to only position and not substantially secure the at least one fairing bar on the bonding tool; and said at least one fairing bar further comprising a plurality of magnets positioned adjacent to the mating face of the at least one fairing bar and aligned with the magnetically conductive portions of the support surface when the mating face of the at least one fairing bar is mounted on the support surface of the bonding tool, securing the at least one fairing bar to the bonding tool sufficiently to resist movement of the at least one fairing bar by vacuum forces of an autoclave.

\* \* \* \* \*

UNITED STATES PATENT AND TRADEMARK OFFICE
CERTIFICATE OF CORRECTION

PATENT NO. : 5,993,184  Page 1 of 3
DATED : November 30, 1999
INVENTOR(S) : C.J. Morrow It is certified that error appears in the above-identified patent and that said Letters Patent is hereby corrected as shown below:

COLUMN   LINE

On the title page:
[57]   Abstract   "either adapted of" should read --either constructed of--
Pg. 1, col. 2   23 of text

[57]   Abstract   "contain" should read --contains--
Pg. 1, col. 2   24 of text 7   12   after "comprises," insert --a--
(Claim 3,   line 3)

7   15   after "magnetically conductive" insert --insert--
(Claim 3,   line 6)

7   21   "the least one" should read --the at least one--
(Claim 4,   line 5)

7   22   "to height" should read --to the height--
(Claim 4,   line 6)

7   22   "the least one" should read --the at least one--
(Claim 4,   line 6)

7   45   "the least one" should read --the at least one--
(Claim 10,   line 2)

UNITED STATES PATENT AND TRADEMARK OFFICE
CERTIFICATE OF CORRECTION

PATENT NO. : 5,993,184
DATED : November 30, 1999
INVENTOR(S) : C.J. Morrow

It is certified that error appears in the above-identified patent and that said Letters Patent is hereby corrected as shown below:

| COLUMN | LINE | |
|---|---|---|
| 7 (Claim 11, | 48 line 2) | "the least one" should read --the at least one-- |
| 7 (Claim 13, | 55 line 2) | after "fairing bar" delete "," |
| 8 (Claim 17, | 10 line 10) | delete "one of" |
| 8 (Claim 17, | 15 line 14) | delete "the other of" |
| 8 (Claim 18, | 36 line 5) | "the least one" should read --the at least one-- |
| 8 (Claim 18, | 37 line 6) | "the least one" should read --the at least one-- |
| 8 (Claim 24, | 61 line 3) | delete "one of" |
| 8 (Claim 25, | 66 line 3) | delete "one of" |

UNITED STATES PATENT AND TRADEMARK OFFICE
CERTIFICATE OF CORRECTION

PATENT NO. : 5,993,184

DATED : November 30, 1999

INVENTOR(S) : C.J. Morrow

It is certified that error appears in the above-identified patent and that said Letters Patent is hereby corrected as shown below:

| COLUMN | LINE | |
|---|---|---|
| 9 (Claim 26, | 4 line 4) | after "tool" delete "," |
| 9 (Claim 27, | 6 line 2) | delete "the other of" |
| 9 (Claim 27, | 8 line 4) | after "tool" delete "," |

Signed and Sealed this

Twenty-second Day of May, 2001

Attest:

NICHOLAS P. GODICI

Attesting Officer

Acting Director of the United States Patent and Trademark Office